United States Patent [19]

Lecland et al.

[11] Patent Number: 5,774,111

[45] Date of Patent: Jun. 30, 1998

[54] METHOD AND APPARATUS FOR PROVIDING A DYNAMICALLY ORIENTED COMPASS CURSOR ON COMPUTER DISPLAYS

[75] Inventors: Pascal Lecland, Rueil Malmaison; Antoine Balestriéri, Suresnes; Duy Minh Vu, Puteaux; André Clément, Palaiseau, all of France

[73] Assignee: Dassault Systemes, Suresnes, France

[21] Appl. No.: 601,427

[22] Filed: Feb. 12, 1996

[51] Int. Cl.$^6$ ................................................ G09G 5/08
[52] U.S. Cl. .............................................. 345/145; 345/127
[58] Field of Search .................................. 345/126, 145, 345/961, 964, 441, 443, 326, 336; 395/961, 964, 141, 143, 763, 326, 336; 707/502

[56] References Cited

U.S. PATENT DOCUMENTS

| | | |
|---|---|---|
| 4,785,399 | 11/1988 | Evans et al. . |
| 4,845,643 | 7/1989 | Clapp . |
| 4,855,939 | 8/1989 | Fitzgerald, Jr. et al. . |
| 5,010,502 | 4/1991 | Diebel et al. . |
| 5,123,087 | 6/1992 | Newell et al. . |
| 5,138,697 | 8/1992 | Yamaoto et al. . |
| 5,198,990 | 3/1993 | Farzan et al. . |
| 5,251,268 | 10/1993 | Colley et al. . |
| 5,297,241 | 3/1994 | Hirr, Jr. et al. . |
| 5,299,307 | 3/1994 | Young . |
| 5,353,395 | 10/1994 | Tokumasu et al. . |
| 5,371,845 | 12/1994 | Newell et al. . |
| 5,377,313 | 12/1994 | Scheibl . |
| 5,390,294 | 2/1995 | Takeuchi . |
| 5,396,565 | 3/1995 | Asogawa . |
| 5,412,762 | 5/1995 | Kondo . |
| 5,425,109 | 6/1995 | Saga et al. . |
| 5,461,709 | 10/1995 | Brown . |
| 5,463,722 | 10/1995 | Venolia . |
| 5,465,324 | 11/1995 | Lee et al. . |
| 5,490,241 | 2/1996 | Mallgren et al. . |

FOREIGN PATENT DOCUMENTS

| | | | |
|---|---|---|---|
| 0697679 | 4/1995 | European Pat. Off. | ........ G06T 17/00 |

OTHER PUBLICATIONS

"Declaration of Christopher C. Romes", executed Jul. 26, 1995.

Luzadder W., "Fundamentals of Engineering Drawing", pp. 85–86, 1981.

Kanai, et al., "Generation of Free–Form surface Models by Understanding Geometric and Topological Constraints on Rough Sketches", Systems Engineering, 1992 International.

Newton, "Tips & Techniques", Apple Computers, Inc. 1993.

Newton, Message Pad 100 Setup and Handwriting Guide, Apple Computer, Inc. 1994.

Newton, "Message Pad Handbook", 1993.

H. Samet, "The Design and Analysis of Spatial Structures", pp. 1–151.

*Primary Examiner*—Jeffrey A Brier
*Attorney, Agent, or Firm*—Blakely, Sokoloff Taylor, & Zafman LLP.

[57] ABSTRACT

A computer-aided design and drawing system having a dynamically oriented compass cursor is disclosed. In the interactive computer-controlled drawing system, a method and apparatus is disclosed for automatically generating and manipulating a dynamic compass cursor. The method comprises the steps of: 1) generating a compass cursor in a first orientation, the compass cursor being responsive to movement of a cursor control device; 2) selecting a geometrical element having a second orientation; and 3) selectively re-orienting the compass to the second orientation and maintaining the second orientation until a new orientation for the dynamic compass cursor is selected.

20 Claims, 16 Drawing Sheets

METHOD AND APPARATUS FOR PROVIDING A DYNAMICALLY ORIENTED COMPASS CURSOR ON COMPUTER DISPLAYS

BACKGROUND OF THE INVENTION

1. Field of the Invention

The present invention relates to the field of computer systems having cursor or pointing devices. Specifically, the field is that of interactive display control devices used for drawing and manipulating graphic or textual geometry on a display screen.

2. Related Art

Interactive computer systems are commonly used for computer-aided design and drafting. These computer applications typically provide interactive controls for creating and manipulating geometry for display on a computer display screen. Several embodiments of these systems in the prior art are set forth below.

U.S. Pat. No. 5,371,845 issued on Dec. 6, 1994, to Ashlar, Incorporated of Sunnyvale, Calif. describes a system and method for the creation of graphic images including automatic pull-off creation and maintenance of tangent and perpendicular lines, creation and maintenance of objects satisfying mutual geometric relationships, the identification and processing of visual intersections, and alignment in three dimensional space. The Ashlar patent includes a description of the automatic recognition of interesting points, the use of screen messages to identify points, the use of a secondary cursor, the creation of temporary geometry, the examination of interesting points which arise from actual geometry, temporary geometry, and/or the interaction of actual and temporary geometry.

U.S. Pat. No. 5,123,087 issued Jun. 16, 1992, to Ashlar, Incorporated of Sunnyvale, Calif. describes a computer aided drafting system and method for automatically locating geometric points for a user. The disclosed method includes defining a type of geometric point which includes a point type of interest to the user, setting a hit radius, displaying an object, displaying a cursor to indicate a location, testing the object to find a point having the defined point type, which is within the hit radius of the cursor, and if a point is found then displaying the point.

U.S. Pat. No. 5,299,307 issued Mar. 29, 1994, to Claris Corporation of Santa Clara, Calif. discloses a method and apparatus for generating and manipulating graphic objects on a computer display screen. The disclosed system includes a graphic guide used for associating edges and points of one graphic image with one or more other images. The graphic guide operates in relation to the position of a cursor on the computer display screen. The graphic guide is displayed only so long as the cursor remains within a proximity region associated with a point on an object.

U.S. Pat. No. 5,465,324 issued Nov. 7, 1995, to Hewlett Packard Company of Palo Alto, Calif. discloses a computer aided design system providing a means for assisting the user in defining and editing geometric objects. The invention proposes several useful geometric relations between the cursor position and the already defined geometric object independent of the cursor position. For example, if an already defined circle is within a catch range of the cursor position, the system proposes to draw a line from the cursor position to the center of the circle, and proposes tangents from the cursor position to the circle. The disclosed invention also proposes to generate the geometric relation (design proposal) independent of the cursor position. Using the disclosed invention, relations between two geometric objects can be proposed regardless of the cursor position.

U.S. Pat. No. 5,463,722 issued Oct. 31, 1995, to Apple Computer, Incorporated of Cupertino, Calif. discloses a method and apparatus for automatic alignment of manipulated objects in two dimensional and three dimensional graphic space. The disclosed invention provides an alignment field gradient which emanates from objects surrounding the manipulated object(s). As a user manipulates an object, the disclosed invention attracts the manipulated object into an aligned position and orientation with another object(s) in the displayed three dimensional display space. The present invention provides alignment of all combinations adversities, edges, and planer faces for three dimensional polyhedral objects and for all combinations adversities and edges for two dimensional polygonal objects.

U.S. Pat. No. 5,297,241 issued Mar. 22, 1994, to Hewlett Packard Company of Palo Alto, Calif. discloses a method for automated re-layout of two dimensional drawings from a solid model wherein the solid model can be revised to incorporate design changes.

U.S. Pat. No. 5,461,709 issued Oct. 24, 1995, to Intergraph Corporation of Huntsville, Ala. discloses a system for establishing the location of data points in a model space represented in a view of a two dimensional display. In one embodiment, the system has a pointing device (such as a mouse) for establishing the location of a cursor on the display, and also an arrangement for establishing in the model space primary and secondary orientation planes of which one is currently active at any given time. On command (typically when the cursor is in a desired position) a tentative selection arrangement copies data for a current point to data for a tentative point and toggles an active plane from one to the other of the primary and secondary planes.

A published article titled "Snap Dragging in Three Dimensions", by Eric A. Brier or Xerox PARC, published in the ACM, #089791-351-5/90/0003/0193, dated 1990, describes tools for placing and orienting objects in three dimensions. This reference and other items of prior art describe techniques for showing vertical or horizontal orientation but without the ability to record or memorize the orientation of a shape for later use in drawing other shapes.

A number of disadvantages exist with the cursor control mechanisms existing in the prior art. First, the displayed cursor symbols in prior art systems do not dynamically adjust position or re-orient themselves as a selection is made of another two-dimensional (2D) or a three dimensional (3D) displayed element. Secondly, prior art cursor control systems cannot provide dynamic feedback of information related to another displayed element. Thirdly, prior art cursor control techniques cannot be used to apply an orientation constraint on other displayed and generated elements.

As will be discussed below, the present invention provides an improved computer-assisted design and drawing system which overcomes the disadvantages of the prior art systems.

SUMMARY OF THE INVENTION

A computer-aided design and drawing system having a dynamically oriented compass cursor is disclosed. The preferred embodiment comprises an interactive computer controlled display system, including a bus for interconnecting system components, a processor, a random access memory, an optional read-only memory, a data storage means for storing data, a display device including a display screen, an alphanumeric input device, a cursor control device for interactively positioning a cursor on the display screen, and a signal generation device or mouse button. In the interactive computer-controlled drawing system, a method and apparatus is disclosed for automatically generating and manipulating a dynamic compass cursor. The method comprises the steps of: 1) generating a compass cursor in a first orientation, the compass cursor being responsive to movement of a cursor control device; 2) selecting a geometrical element having a second orientation; and 3) selectively re-orienting the compass to the second orientation and maintaining the second orientation until a new orientation for the dynamic compass cursor is selected.

It is an advantage of the present invention that compass cursor is able to adapt its form and orientation to provide visual feedback for a computer user. It is a further advantage of the present invention that numerical and qualitative information can be linked to a cursor control device. It is a further advantage of the present invention that the cursor is able to record, to use, and to show exactly the local characteristics of any geometrical element displayed on the display screen in 2D or 3D. It is a further advantage of the present invention that a user can get and apply any orientation constraint on a drawing.

These and other features and advantages of the computer-aided design and drawing system of the present invention are described herein. The means and methods of the present invention are described in more detail in the detailed description that follows.

BRIEF DESCRIPTION OF THE DRAWINGS

FIGS. 8–10 are flowcharts illustrating the processing logic of the present invention.

DETAILED DESCRIPTION OF THE INVENTION

A computer-aided design and drawing system having a dynamically oriented compass cursor is disclosed. In the following description, specific displays, configurations, and methods are set forth in order to provide a thorough understanding of the present invention. However, it will be apparent to one of ordinary skill in the art that the present invention may be practiced without these specific details. In other instances, well known systems are shown in block diagram form in order not to unnecessarily obscure the present invention.

Figure 1:
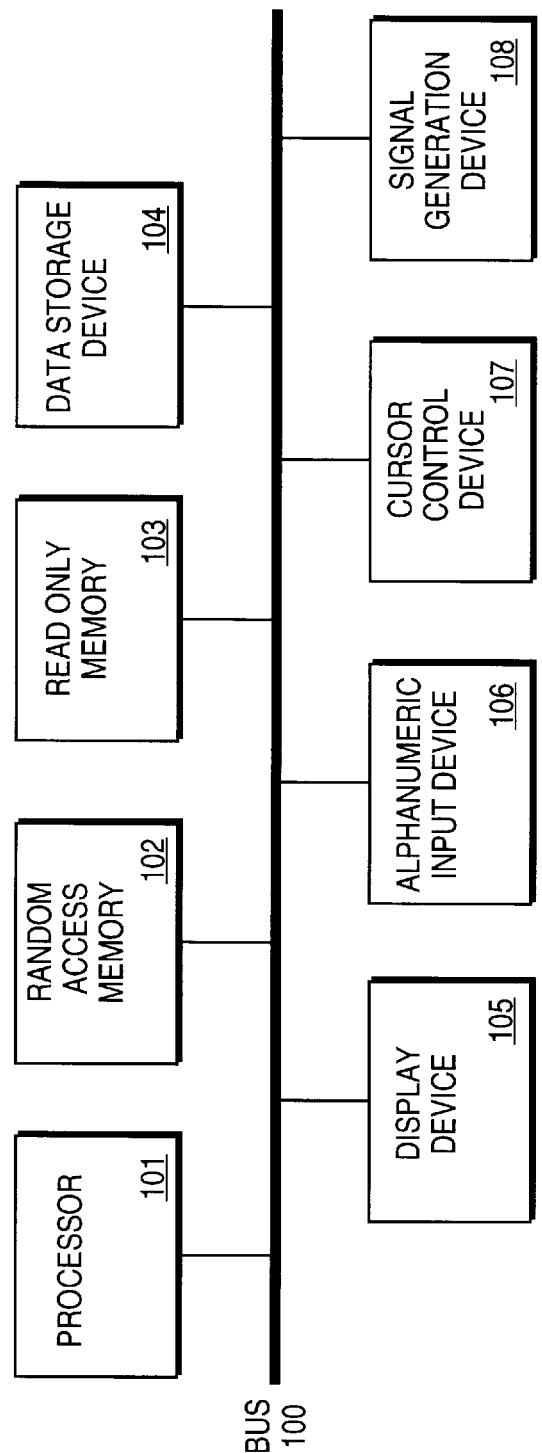
FIG. 1 is an illustration of a typical computer system architecture upon which the present invention may operate.

Referring now to FIG. 1, the computer system architecture of the preferred embodiment of the present invention is shown. This preferred embodiment is implemented on a conventional computer system. It is apparent to one of ordinary skill in the art, however, that alternative computer systems may be employed. In general, such systems as illustrated by FIG. 1 comprise a bus 100 for communicating information, a processor 101 coupled with the bus 100 for processing information, a random access memory 102 coupled with the bus 100 for storing information and instructions for the processor 101, an optional read-only memory 103 coupled with the bus 100 for storing static information and instructions for the processor 101, a data storage device 104 such as a magnetic disk and disk drive coupled with the bus 100 for storing information and instructions, a display device 105 coupled to the bus 100 for displaying information to the computer user, an alphanumeric input device 106 including alphanumeric and function keys coupled to the bus 100 for communicating information and command selections to the processor 101, a cursor control device or pointing device 107 coupled to the bus 100 for communicating information and command selections to the processor 101, and a signal generation device 108 coupled to the bus 100 for communicating command selections to the processor 101.

The display device 105 may be a liquid crystal device (LCD), cathode ray tube (CRT), or other suitable display device. The cursor control device 107 allows the computer user to dynamically signal the two dimensional movement of a visible symbol on the display screen of the display device 105. Many implementations of the cursor control device are known in the art, including trackball, mouse, joystick, or special keys on the alphanumeric input device 106 capable of signaling movement in a given direction.

The computer-assisted design and drawing system of the present invention provides additional controls and enhancements for these computer systems. These features of the present invention are described in the following sections. The general operation of the computer system or cursor control device is described only where necessary to provide a thorough understanding of the present invention, since these methods are well known to those of ordinary skill in the art.

The computer assisted design and drawing system of the preferred embodiment provides an improved graphical user interface, with which a user may more effectively and quickly generate drawings in a computer environment. Prior art computer systems provide windowing capabilities and tools for drawing various types of objects or geometric shapes on the display screen. In the preferred embodiment, these tools are activated and used with a cursor control device or mouse using techniques known in the art. Once an object is drawn, however, the present invention provides additional features for assisting the user in drawing other objects or in placing, orienting, or studying a single object.

The main additional feature of the present invention is a dynamically oriented compass cursor. As described herein, the cursor is a visual symbol displayed on a display screen that moves in any direction in correspondence with movement of the cursor control device. Prior art systems typically provide a fixed symbol cursor used to simply inform the user of a particular location on the display screen. The dynamic compass cursor of the present invention improves the utility of the cursor by conveying orientation and geometrical relationships with other displayed objects in addition to informing the user of the position of the cursor on the display screen.

Figure 2:
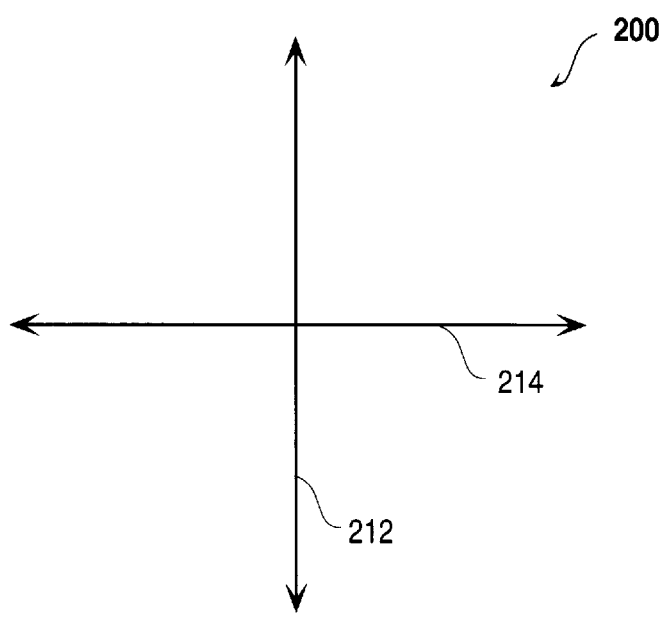
FIG. 2 illustrates the compass cursor of the preferred embodiment.

FIG. 2 illustrates the compass cursor symbol 200 used in the preferred embodiment. This symbol is comprised in the preferred embodiment of two orthogonal intersecting line segments 212 and 214 terminated in arrowheads. It will be apparent to those of ordinary skill in the art that alternative symbols conveying an orientation are conceivable. The compass cursor symbol (compass) 200 is initially displayed with the vertical line segment of the compass 212 being parallel with a vertical axis of the display screen and the horizontal line segment of the compass 214 being parallel with a horizontal axis of the display screen. The compass 200 is slaved to movement of the cursor control device; thus, the compass 200 moves two-dimensionally on the display screen as the cursor control device is moved.

Figure 3A:
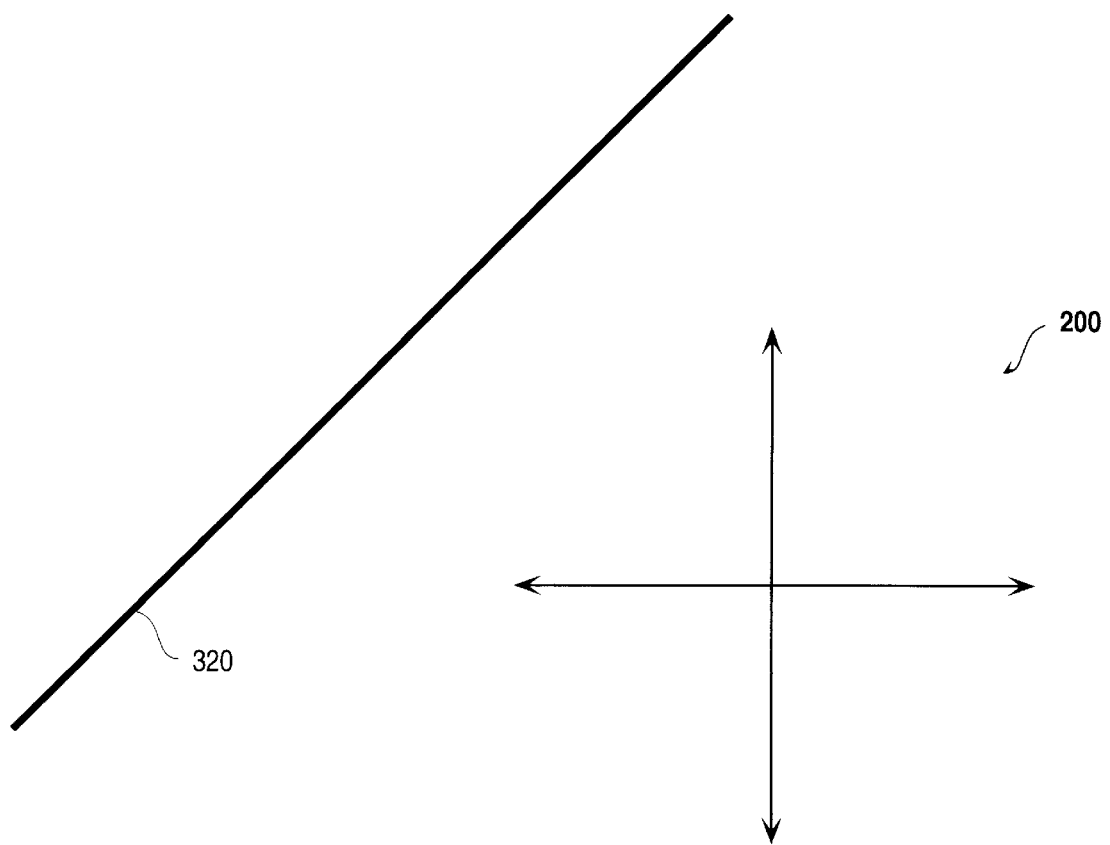
FIGS. 3A–3D illustrate the selection of a line object and the corresponding operation of the compass of the preferred embodiment.
Figure 3B:
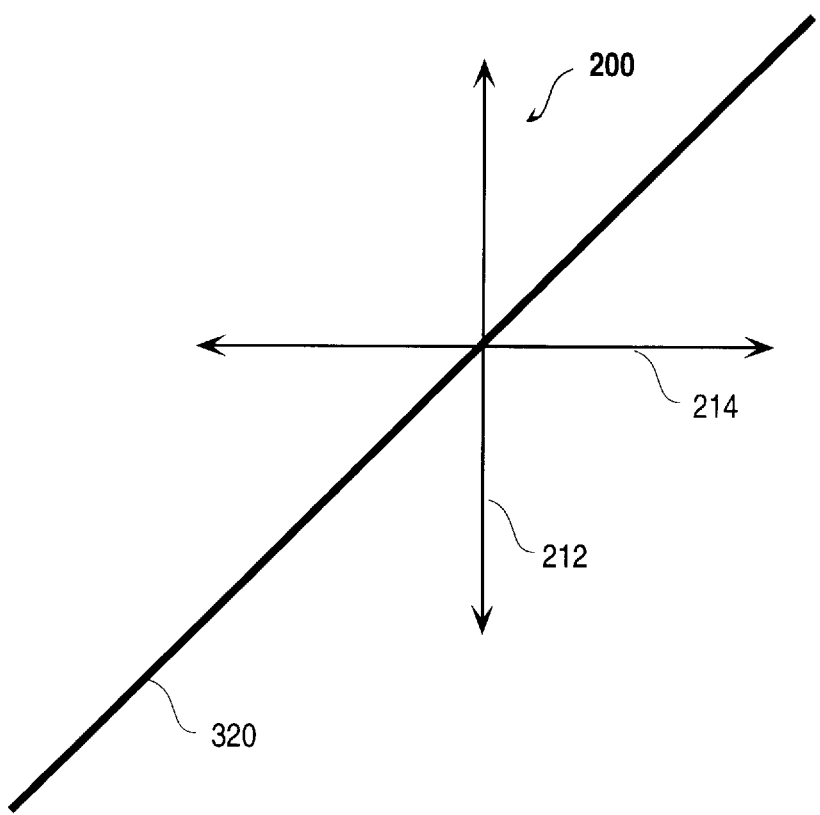
Figure 3C:
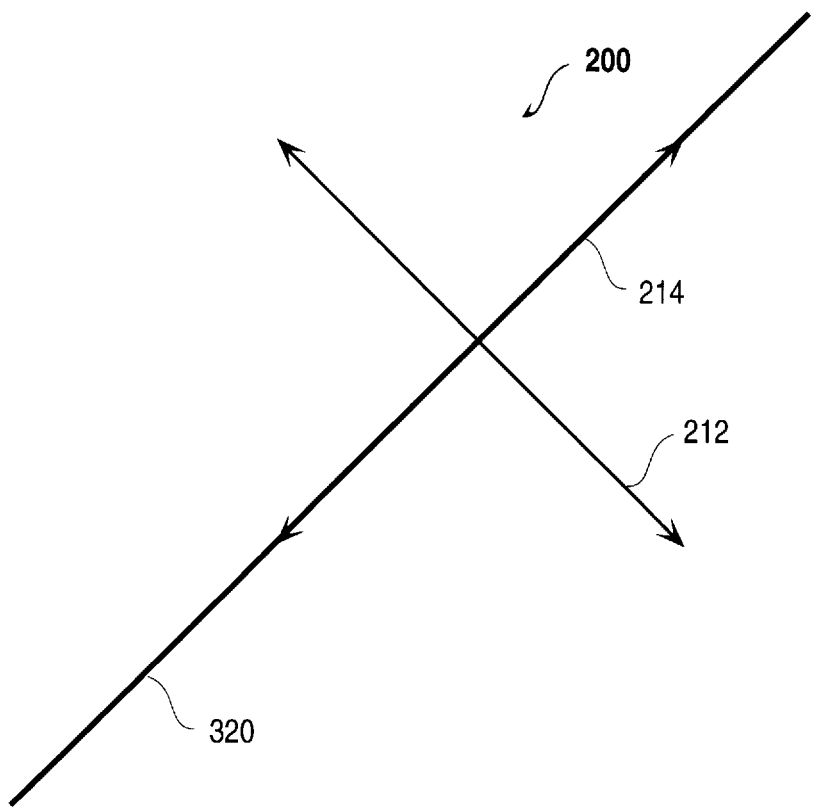

The key features of the compass of the present invention are invoked when a previously drawn geographical element is selected or when a geometrical element is drawn. Referring to FIGS. 3A–3D, an example illustrates the dynamic orientation of the compass 200 of the present invention as a line element 320 is selected. Referring to FIG. 3A, a drawing includes a previously drawn line segment 320 and compass 200 in an initial orientation. In FIG. 3B, compass 200 is moved using the cursor control device so the compass overlays line 320 (i.e. the intersection of compass lines 212 and 214 intersects or is within a proximity distance of intersecting line 320). Now, using well known techniques, the draftsperson may select line segment 320 using a mouse button, a function key, or other means for indicating a command selection. Once line segment 320 is selected, the compass 200 of the present invention performs the operation as illustrated in FIG. 3C.

Figure 3D:
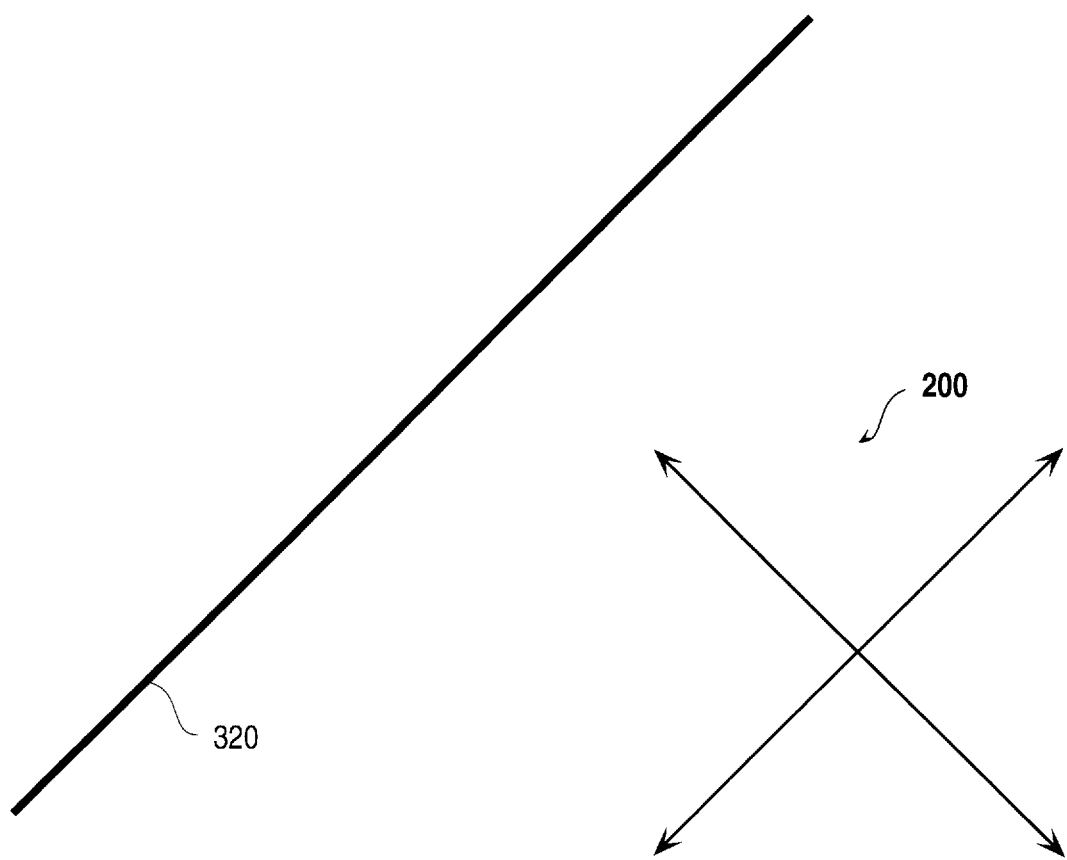

Referring to FIG. 3C, the compass 200 of the present invention dynamically changes orientation so one of the compass lines 214 is parallel to the selected line 320 and the other compass line 212 is perpendicular to the selected line 320. This dynamic re-orientation of the cursor 200 assists the draftsperson to accurately draw other geometry in an orientation relationship to line 320 by memorizing the slope of line 320 with the new orientation of compass 200. In the preferred embodiment, the line 320 is also highlighted or displayed in a distinctive new color to indicate the association between the selected element and the new compass orientation. When the compass 200 is moved away from line 320 as shown in FIG. 3D, the compass 200 retains the orientation of line 320 and line 320 remains highlighted until another orientation is selected using the same process.

Figure 4A:
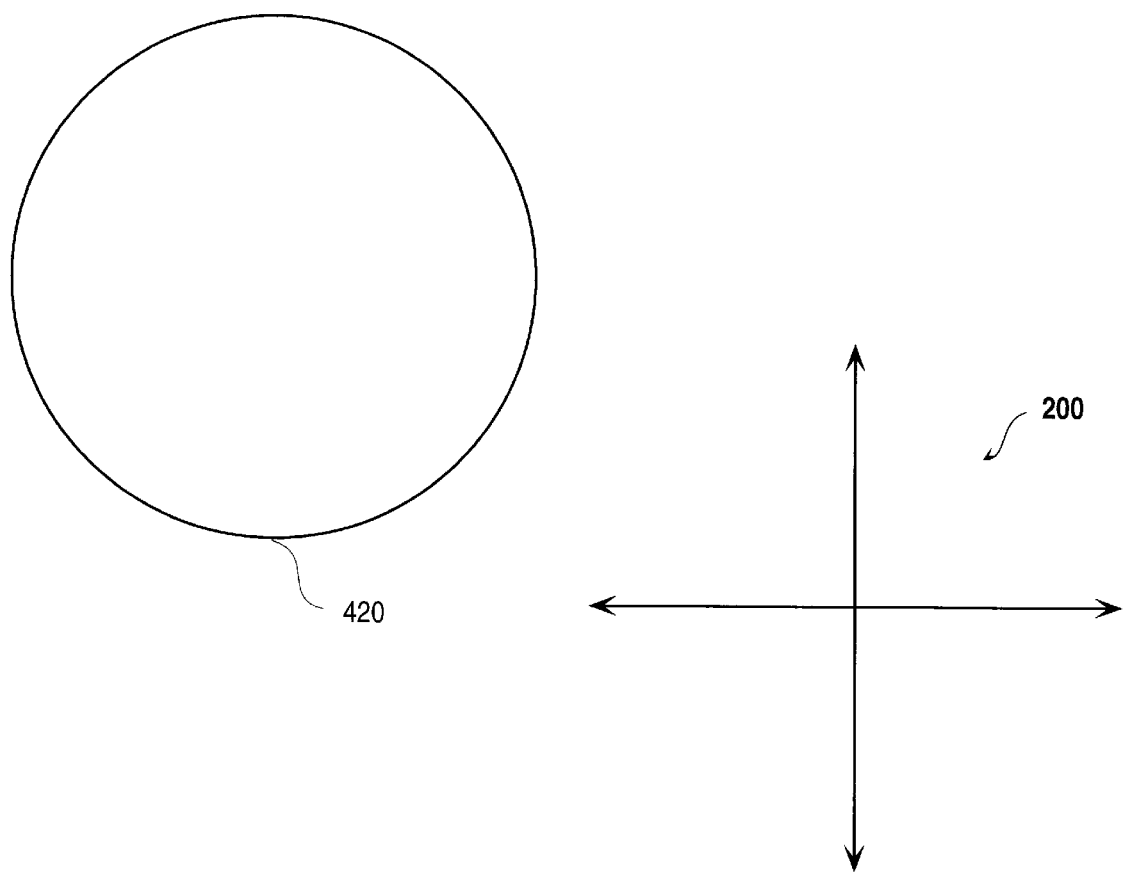
FIGS. 4A–4D illustrate the selection of a circle object and the corresponding operation of the compass of the preferred embodiment.
Figure 4B:
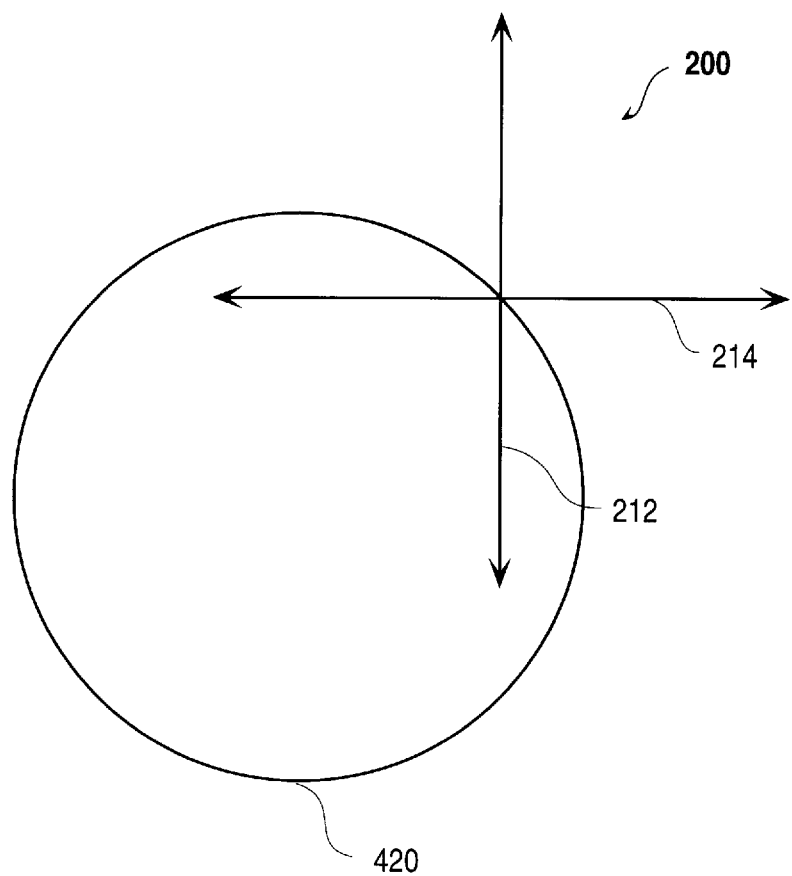
Figure 4C:
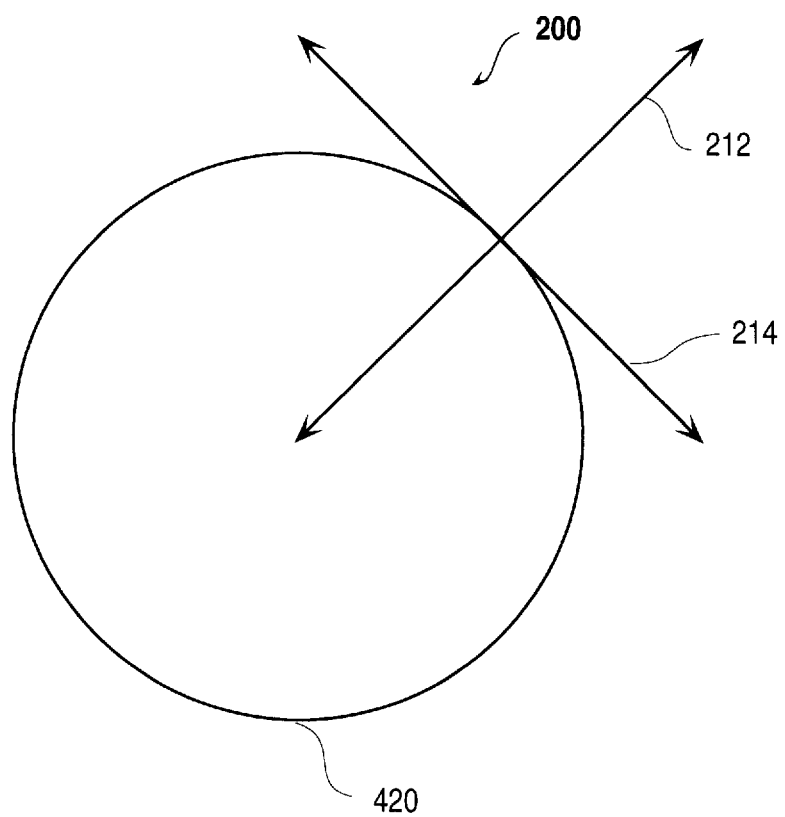

Referring to FIGS. 4A–4D, another example illustrates the dynamic orientation of the compass 200 of the present invention as a circular, elliptical, or arc element 420 is selected. Referring to FIG. 4A, a drawing includes a previously drawn circle 420 and compass 200 in an initial orientation. In FIG. 4B, compass 200 is moved using the cursor control device so the compass overlays circle 420 (i.e. the intersection of compass lines 212 and 214 intersects or is within a proximity distance of intersecting circle 420). Now, using well known techniques, the draftsperson may select circle 420 using a mouse button, a function key, or other means for indicating a command selection. Once circle 420 is selected, the compass 200 of the present invention performs the operation as illustrated in FIG. 4C.

Figure 4D:
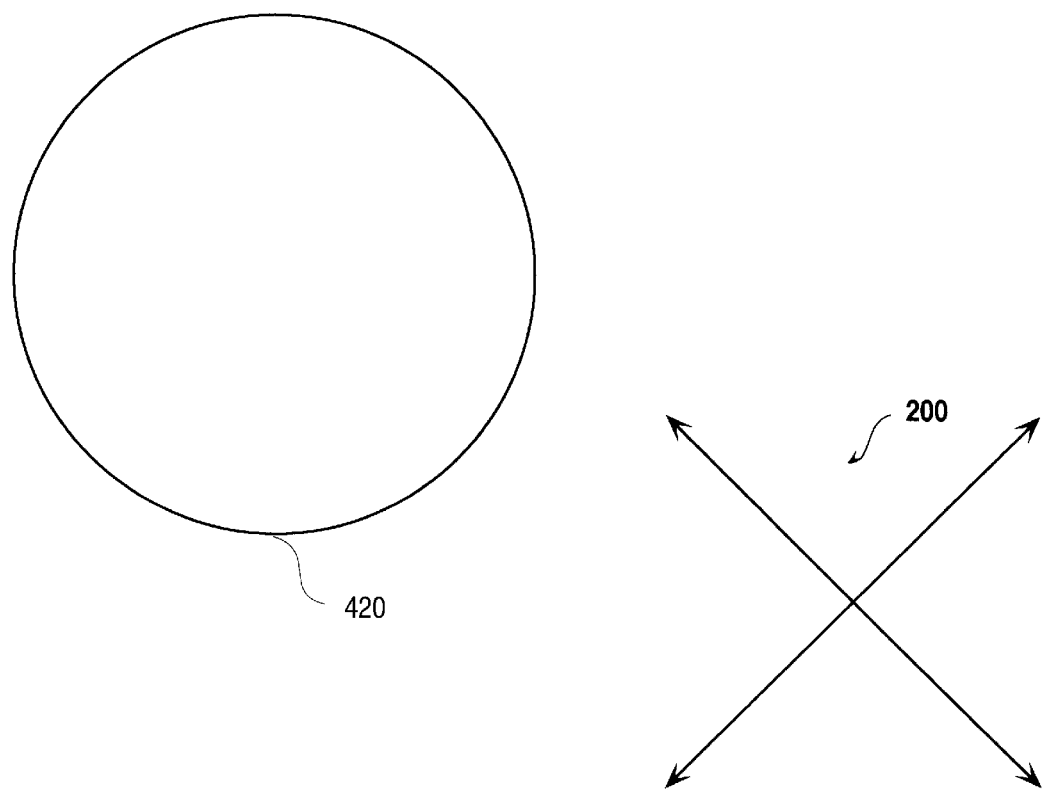

Referring to FIG. 4C, the compass 200 of the present invention dynamically changes orientation so one of the compass lines 214 is tangent to the selected circle 420 at the point of intersection and the other compass line 212 is perpendicular to the tangent of the selected circle 420 at the point of intersection. This dynamic re-orientation of the cursor 200 assists the draftsperson to accurately draw other geometry in an orientation relationship to circle 420 by memorizing the tangent of circle 420 with the new orientation of compass 200. In the preferred embodiment, the circle 420 is highlighted or displayed in a distinctive new color to indicate the association between the selected element and the new compass orientation. When the compass 200 is moved away from circle 420 as shown in FIG. 4D, the compass 200 retains the orientation of circle 420 and circle 420 remains highlighted until another orientation is selected using the same process.

In addition to memorizing the slope of a line or the tangent of an circle, the compass 200 of the present invention can be used to memorize other geometrical relationships. For example, the draftsperson can specify an explicit angular orientation by entering a direction at which one of the lines of compass 200 is oriented. Other geometrical relationships to which the compass 200 may be oriented will be apparent to those of ordinary skill in the art after reading this disclosure of the preset invention.

Figure 5A:
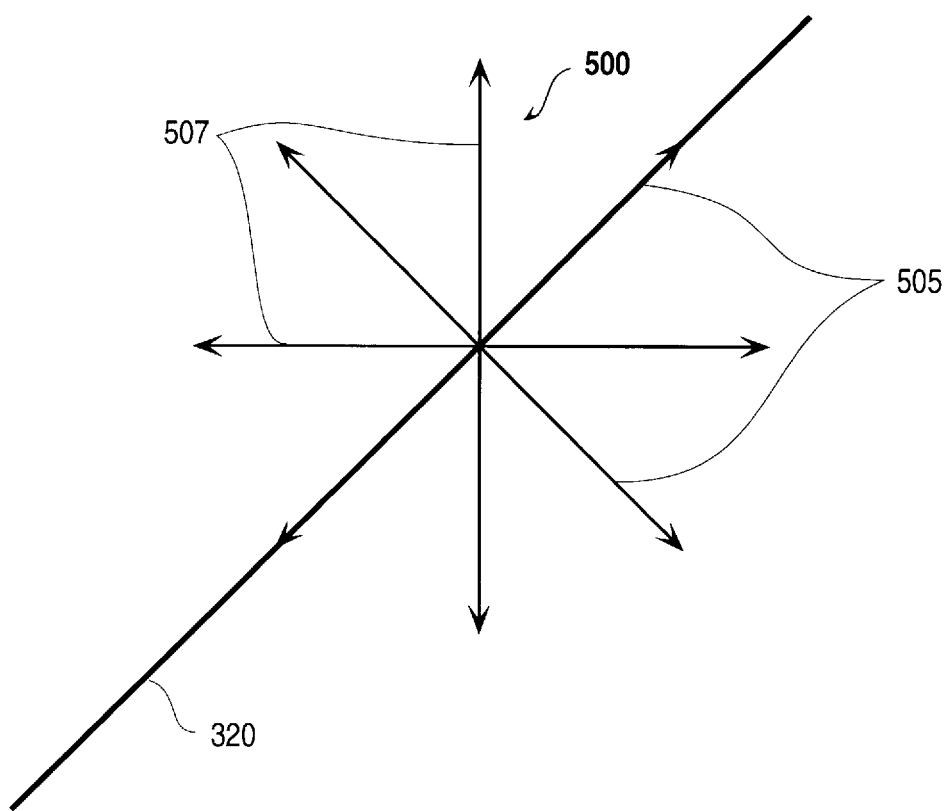
FIGS. 5A–5B illustrate the selection of an object and the corresponding operation of the compass in an accumulation mode.
Figure 5B:
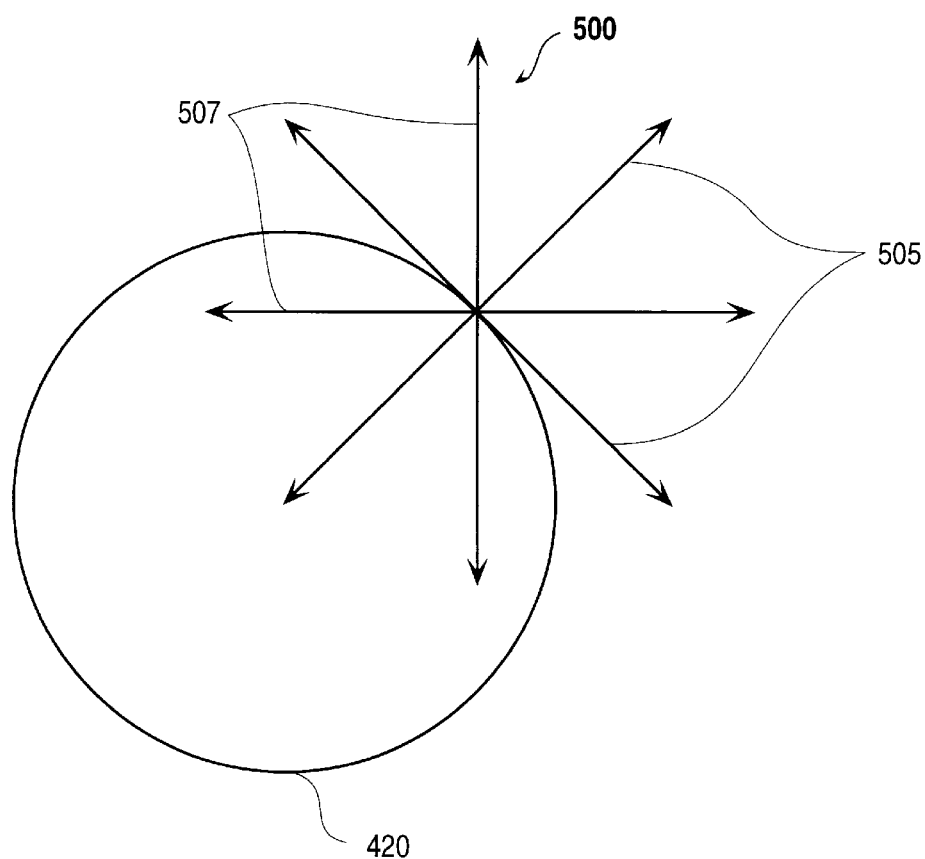

The preferred embodiment of the present invention includes two modes in either of which the compass 200 may be operated. These two modes are: 1) a replacement mode or, 2) an accumulation mode. FIGS. 3A–3D and 4A–4D illustrate the operation of the compass 200 in a replacement mode. In this mode, the new orientation of the compass 200 replaces the old orientation of the compass 200 as shown in FIGS. 3B and 3C and in FIGS. 4B and 4C. In an accumulation mode, the new orientation of the compass 200 is displayed in addition to the old orientation. As shown in FIG. 5A, compass 500 is shown in an accumulation mode after the sequence of steps are performed as described above in connection with FIGS. 3A–3C. FIG. 5B illustrates compass 500 as shown in an accumulation mode after the sequence of steps are performed as described above in connection with FIGS. 4A–4C. In both cases, the new compass orientation 505 is displayed in addition to the previous orientation 507. The accumulation mode allows the draftsperson to retain the orientation of two or more geometrical elements. The preferred embodiment also provides a reset command used to reinitialize the compass orientation and to erase previously saved orientations.

Figure 6:
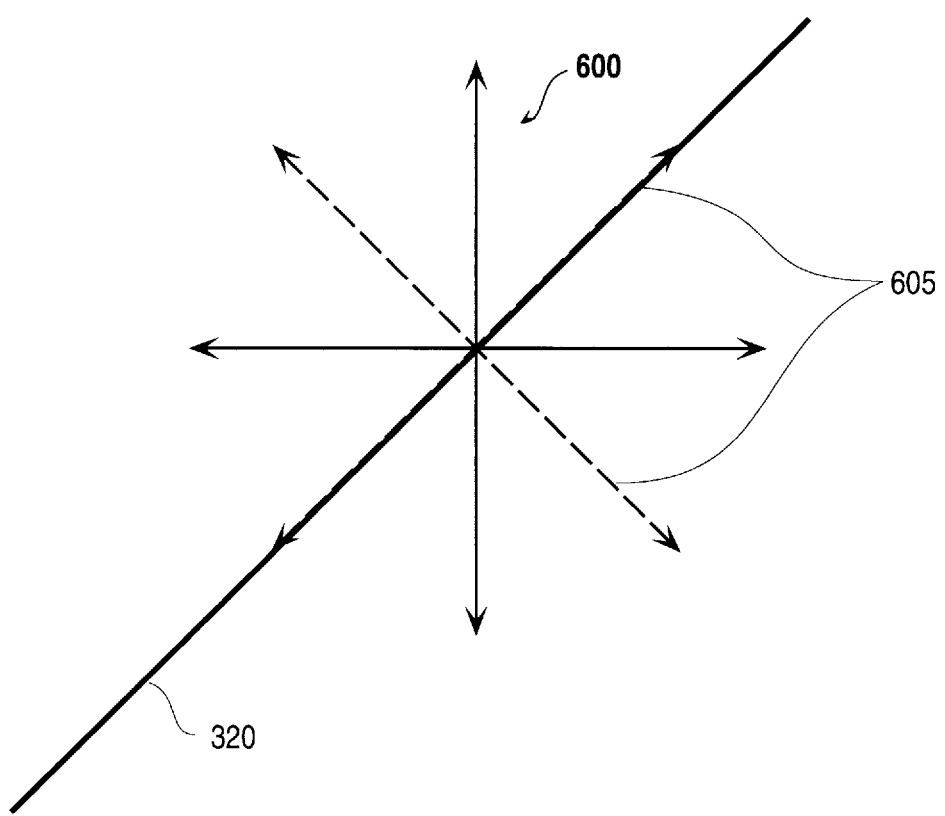
FIG. 6 illustrates the orientation ghosting feature of the preferred embodiment.

FIG. 6 illustrates the compass 600 as it has been moved in proximity to geometrical line element 320 and before any selection of line 320 is made. In the preferred embodiment, the new orientation of the compass 605 is automatically displayed in a ghosted or half intensity form to show the draftsperson what the new orientation would look like if the new orientation is actually selected by selection of line 320. The ghosted orientation 605 is represented in FIG. 6 as dashed lines 605. Once line 320 is selected, the ghosted new orientation 605 is replaced by a full intensity form and the old orientation is erased in a replacement mode (FIG. 3C) or left displayed in an accumulation mode (FIG. 5A). The ghosted new orientation 605 allows a draftsperson to consider a newly proposed compass orientation before the new orientation is actually applied.

Figure 7:
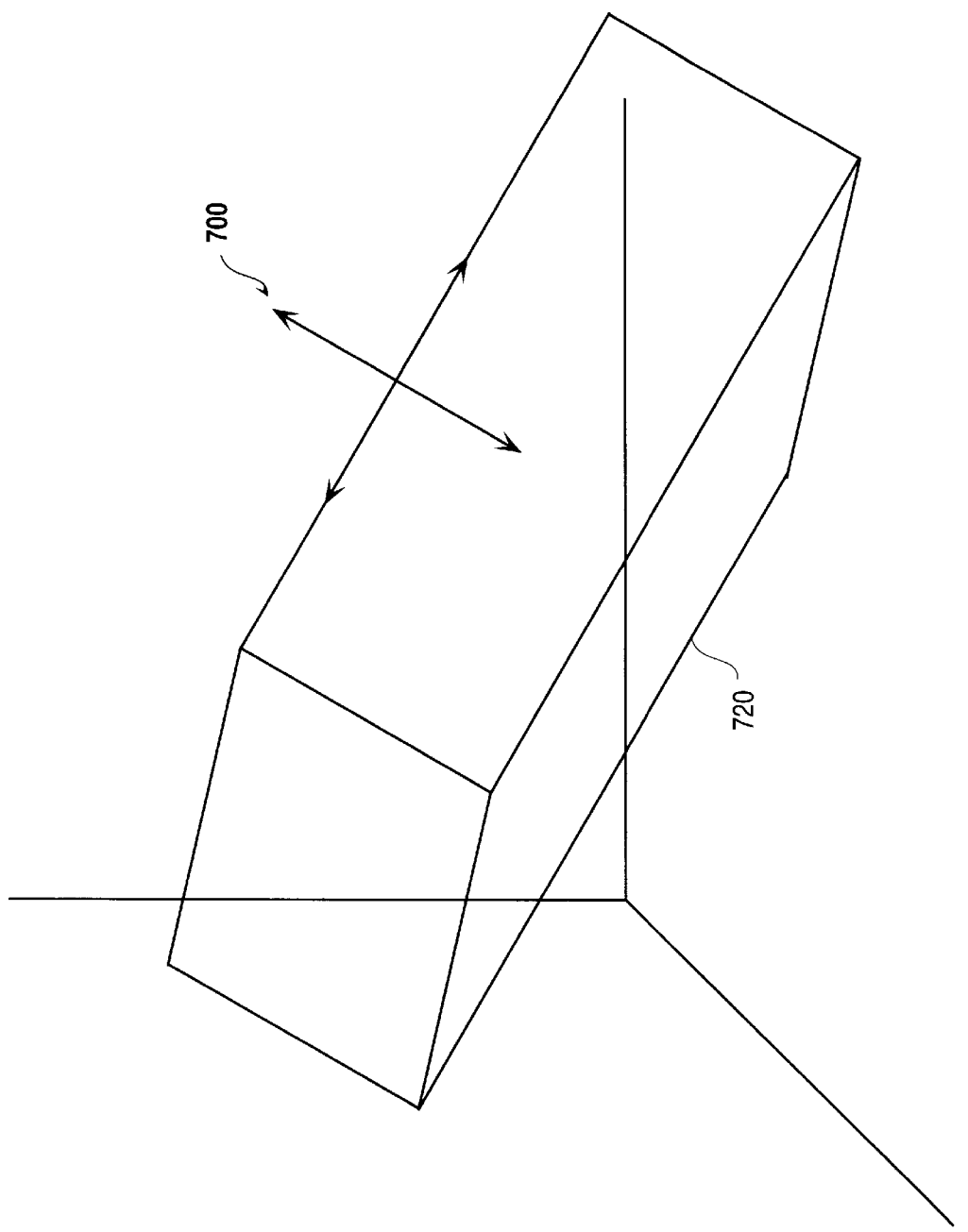
FIG. 7 illustrates the operation of the compass when a 3D object is selected.

The present invention also provides the means for dynamically re-orienting the compass in three-dimensions as well as two dimensions as shown in FIGS. 2–6. FIG. 7 illustrates compass 700 after having been re-oriented on the selection of three-dimensional shape 720 in the same manner as described above for a 2D object. Compass 700 is re-oriented to the plane in which the selected element is drawn.

The present invention includes computer program logic for the operation of an improved computer aided design and drawing system. This logic is described in the following section and in FIGS. 8–10. In addition to the computer resources described earlier, the present invention operates in conjunction with an operating system and system functions capable of displaying windows, graphical and textual information within windows, and other images on the display device. System functions for interfacing with the display control device and user input devices are also required. These resources are standard processing components known in the computer art.

When the processor in the computer system of the present invention is first powered up, the operating system logic receives control and initializes the system components, such as random access memory 102, the display device 105, cursor control device 107, signal generation device 108, and data storage device 104. At the end of its initialization cycle, or in response to a user command, the operating system displays a window and prompts a user to begin the input of the geometrical elements of a computer assisted drawing. The user may also select the operation of the dynamic compass cursor. The program logic associated with the dynamic compass cursor functionality gets control when the user has selected the operation of the dynamic compass cursor. It is apparent to those of ordinary skill in the art that other means for activating the features of the present invention are conceivable.

The dynamic compass cursor functionality is initiated automatically (if so configured) by the operating system once the dynamic compass cursor function is selected by the user. When this occurs, the processing flow begins, as shown in FIG. 8 at the box labeled Processing Logic for Orienting the Compass.

Figure 8:
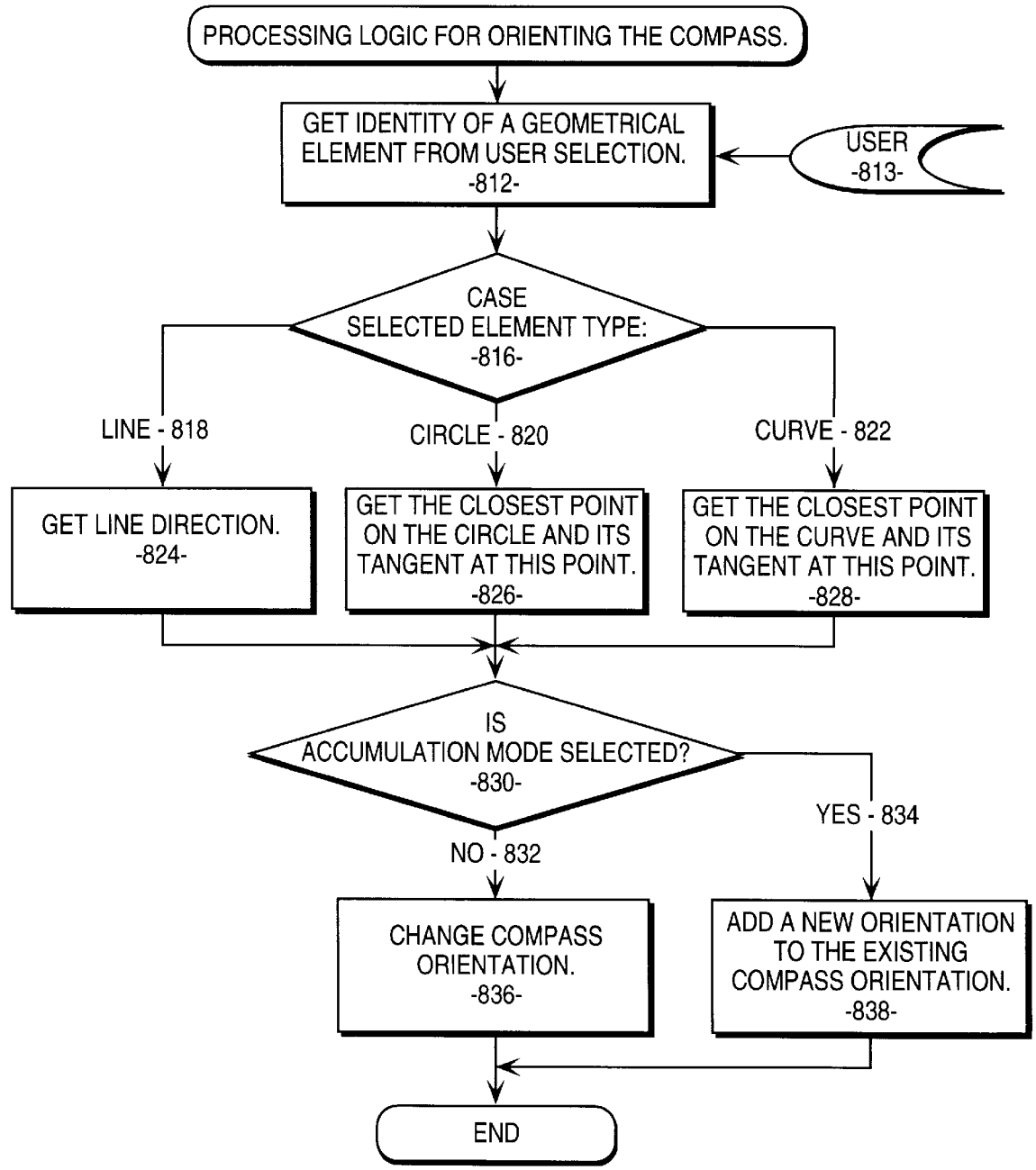

Referring now to FIG. 8, the identity of a geometrical element is obtained from a user 813 selection using conventional techniques. A "Case" statement or similar programming construct is used to select a processing path depending upon the element type selected (block 816). If the selected geometrical element is a line (path 818), the line direction is obtained in block 824. If the selected geometrical element is a circle (path 820), the closest point on the circle to the current cursor position is determined and the tangent at this point is computed in block 826. If the selected geometrical element is a curve (path 822), the closest point on the curve to the current cursor position is determined and the tangent at this point is computed in block 828. If the accumulation mode is not selected (path 832), the compass orientation is changed to be aligned with the line or tangent computed above (block 836). If the accumulation mode is selected (path 834), a new compass orientation aligned with the line or tangent computed above is added to the existing compass orientation (block 838). Compass processing then terminates at the End bubble illustrated in FIG. 8.

Figure 9:
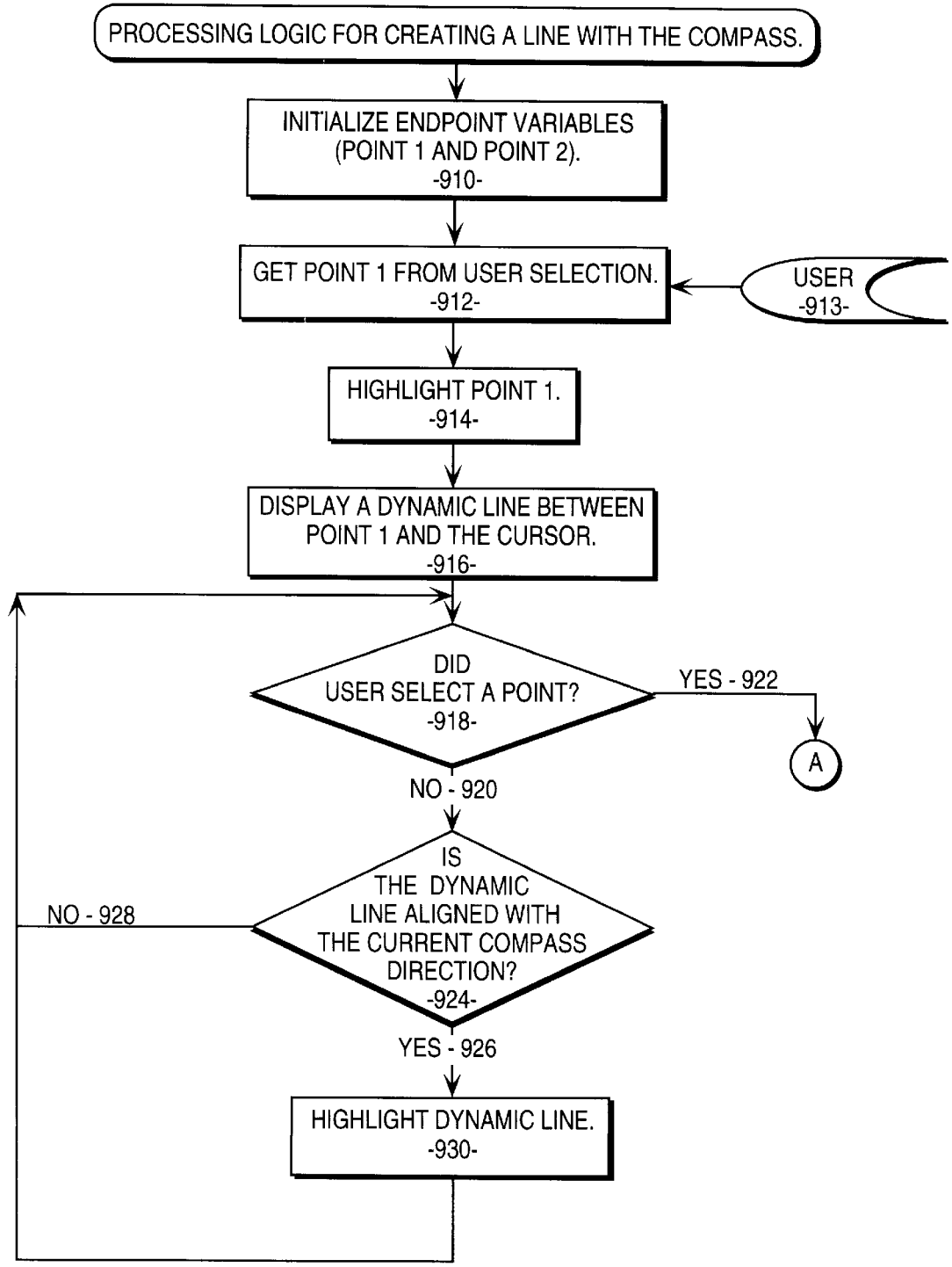

Referring now to FIG. 9, an example illustrates the processing logic of the present invention for creating a line with the compass. First, endpoint variables Point 1 and Point 2 are initialized (block 910). Next, Point 1 information is obtained from user input (block 912). Point 1 is highlighted in block 914. A dynamic line is displayed between point 1 and the cursor (block 916). One endpoint of the dynamic line moves with the cursor. If the user selects a point (path 922), processing continues at the bubble A illustrated in FIG. 10. If not (path 920), the dynamic line alignment is checked against the current compass direction. If the dynamic line is aligned with the current compass direction (path 926), the dynamic line is highlighted in block 930. In this manner, the highlighting of the dynamic line signals to the user when the dynamic line is aligned with the current compass direction. As long as the user does not select a second end point for the primary line object, the dynamic line continues to follow the cursor and the dynamic line continues to be highlighted only when it is aligned with the current compass direction.

Referring now to FIG. 10, processing continues at the bubble A when the user selects a second end point for the primary line object (path 922 in FIG. 9). When this occurs, Point 2 information is obtained from the user in block 940. Point 2 is highlighted in block 942. The line primary object is created between Point 1 and Point 2 in block 944. The primary line object is displayed in block 946 and compass processing terminates at the End bubble shown in FIG. 10.

Although this invention has been shown in relation to a particular embodiment, it should not be considered so limited. Rather, it is limited only by the appended claims.

What is claimed is:

1. In an interactive computer-controlled drawing system, a method for generating and manipulating a dynamic compass cursor, said method comprising the steps of:

generating a compass cursor in a first orientation, said compass cursor being responsive to movement of a cursor control device;

selecting a geometrical element having a second orientation; and automatically re-orienting said compass to said second orientation and maintaining said second orientation until a new orientation for said dynamic compass cursor is selected.

2. The method as claimed in claim 1 wherein said geometrical element is a line.

3. The method as claimed in claim 1 wherein said geometrical element is a circle.

4. The method as claimed in claim 1 wherein said geometrical element is a curve.

5. The method as claimed in claim 1 further including a step of providing a replacement mode wherein said second orientation of said compass is displayed in place of a prior compass orientation.

6. The method as claimed in claim 1 further including a step of providing an accumulation mode wherein said second orientation of said compass is displayed in addition to a prior compass orientation.

7. The method as claimed in claim 1 wherein said geometrical element is a two-dimensional geometrical element.

8. The method as claimed in claim 1 wherein said geometrical element is a three-dimensional geometrical element.

9. The method as claimed in claim 1 further including the steps of displaying a different geometrical element and highlighting said different geometrical element whenever said dynamic compass cursor moves into alignment with said second orientation.

10. The method of claim 1, wherein the step of automatically re-orienting said compass to said second orientation is selective.

11. An interactive computer-controlled drawing apparatus for generating and manipulating a dynamic compass cursor, said apparatus comprising:

means for generating a compass cursor in a first orientation, said compass cursor being responsive to movement of a cursor control device;

means for selecting a geometrical element having a second orientation; and means for automatically re-orienting said compass to said second orientation and maintaining said second orientation until a new orientation for said dynamic compass cursor is selected.

12. The apparatus as claimed in claim 11 wherein said geometrical element is a line.

13. The apparatus as claimed in claim 11 wherein said geometrical element is a circle.

14. The apparatus as claimed in claim 11 wherein said geometrical element is a curve.

15. The apparatus as claimed in claim 11 further including means for providing a replacement mode wherein said second orientation of said compass is displayed in place of a prior compass orientation.

16. The apparatus as claimed in claim 11 further including means for providing an accumulation mode wherein said second orientation of said compass is displayed in addition to a prior compass orientation.

17. The apparatus as claimed in claim 11 wherein said geometrical element is a two-dimensional geometrical element.

18. The apparatus as claimed in claim 11 wherein said geometrical element is a three-dimensional geometrical element.

19. The apparatus as claimed in claim 11 further including means for displaying a different geometrical element and means for highlighting said different geometrical element whenever said dynamic compass cursor moves into alignment with said second orientation.

20. The apparatus of claim 11, wherein the means for automatically re-orienting said compass to said second orientation is selectively operated.

* * * * *